H. H. WELCH.
ELECTRIC RECORDER.
APPLICATION FILED AUG. 8, 1918.
1,381,684. Patented June 14, 1921.
2 SHEETS—SHEET 1.
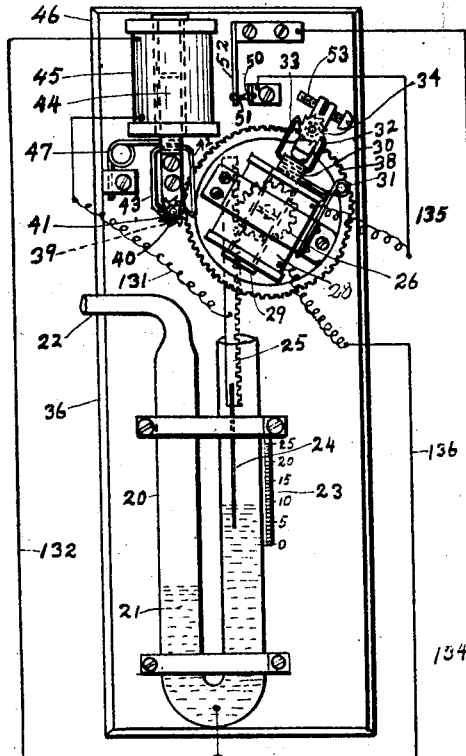
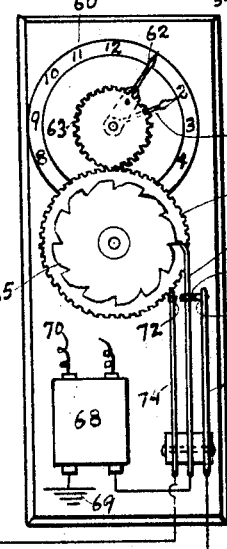
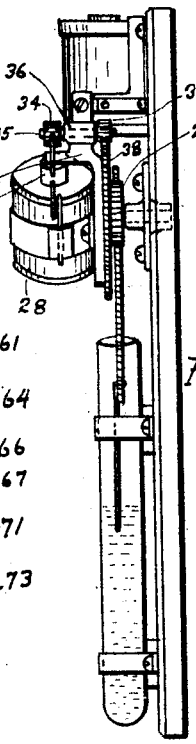
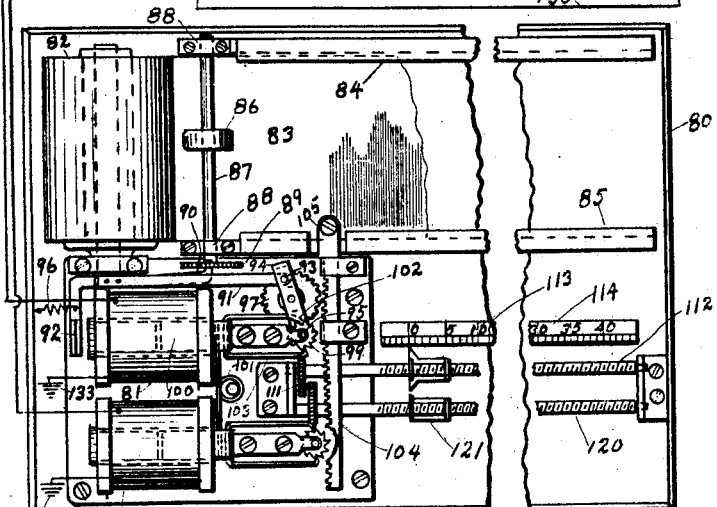
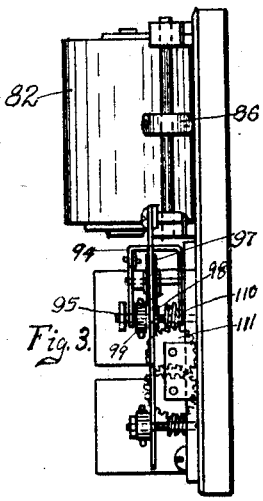
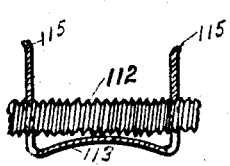
Fig. 1.
Fig. 2.
Fig. 3.
Fig. 4.
INVENTOR
Horace H. Welch
BY
Walter M. Fuller
ATTORNEY H. H. WELCH.
ELECTRIC RECORDER.
APPLICATION FILED AUG. 8, 1918.
1,381,684.
Patented June 14, 1921.
2 SHEETS—SHEET 2.
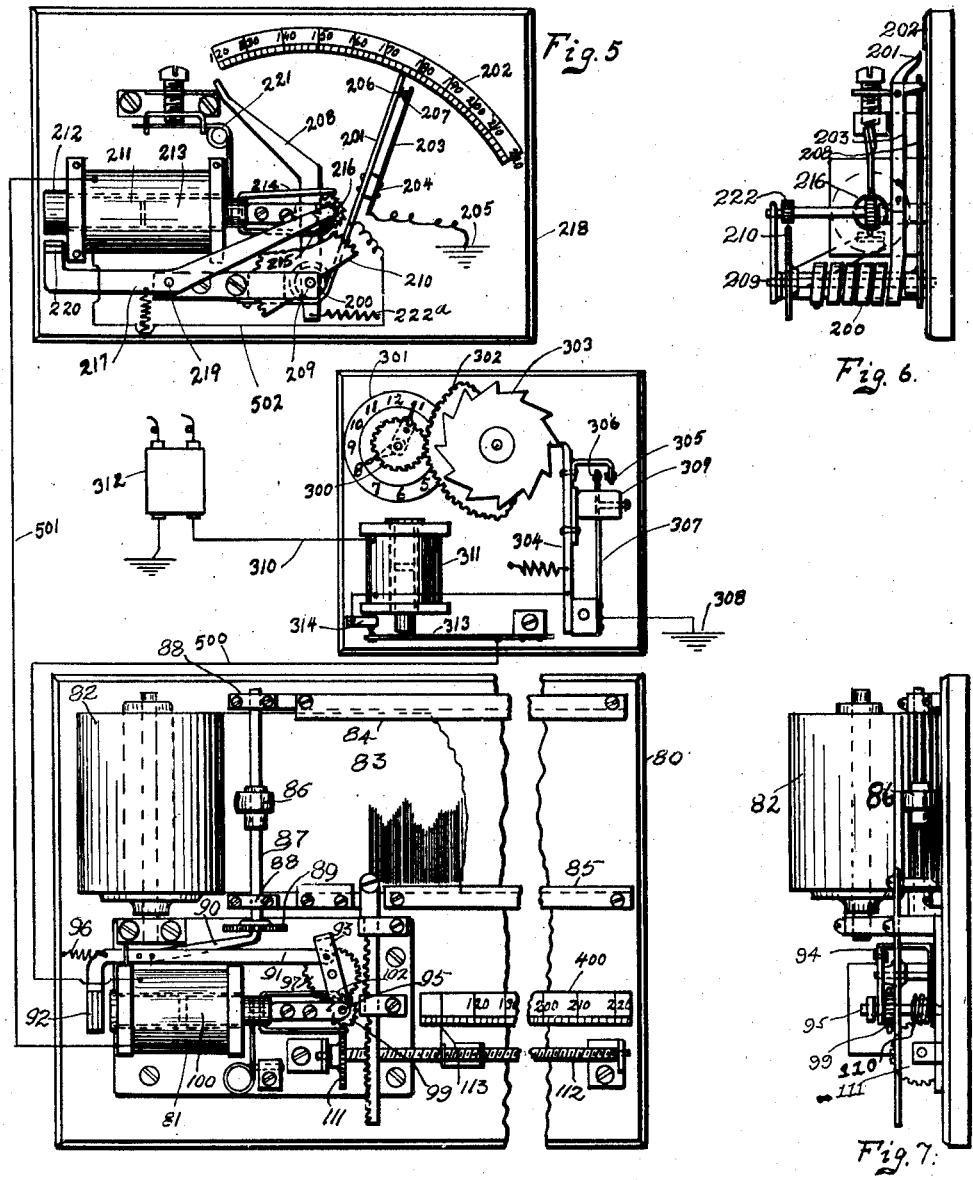
INVENTOR
Horace H. Welch
BY
Walter M. Fuller
ATTORNEY

UNITED STATES PATENT OFFICE.

HORACE H. WELCH, OF CHICAGO, ILLINOIS.

ELECTRIC RECORDER.

1,381,684.  Specification of Letters Patent.  Patented June 14, 1921.

Application filed August 8, 1918. Serial No. 248,840.

*To all whom it may concern:*

Be it known that I, HORACE H. WELCH, a citizen of the United States, residing at Chicago, in the county of Cook and State of Illinois, have invented certain new and useful Improvements in Electric Recorders, of which the following is a specification.

My invention pertains to indicating, registering, or recording appliances adapted, but not exclusively so used, to record or indicate the condition of a variable function or quality such as may, for instance, be registered on a gage of one type or another located at a distance. For example, the mechanism in its preferred embodiment is designed to record at frequent time periods at a remote central station the steam pressure of a boiler, the temperature of water, the amount of draft on the chimney, the load on the boiler, or any other variable function. The appliance not only records automatically the steam pressure for instance at specified time intervals, but it also registers an integration of the individual records so that an average steam pressure may be easily ascertained. In the particular embodiment of the invention set forth in detail herein, one thousand separate records of the pressure during a given time period, such as twenty-four hours, are recorded, and by merely inserting a decimal point at the proper place in the total or integration record the average of all of the readings is had at once, or, if preferred, the scale may be graduated so as to give the average or mean value.

The improved device comprises a gage of some sort such as a steam-pressure gage or manometer with a movable element or index such as a pointer or body of mercury, the position of which is controlled or governed by the variable factor, *i. e.* the steam pressure.

By means of suitable clockwork a movable member is actuated at predetermined intervals electro-magnetically step by step from a base or normal position until it is in register or coincident with such index or movable element at which point it makes or breaks or otherwise influences an electric-circuit preventing its further advance and causing or permitting its return to its original or normal position. Simultaneously or synchronously with this forward stepping of the member, a marker is actuated in similar intermittent manner to record the range of forward travel of the member and when the latter reaches a position corresponding to that of the pressure-gage index, the movement of the marker ceases and returns to its original position, the record sheet of paper being automatically shifted at any suitable time for the reception of the next mark the length of which represents the pressure. Such central station apparatus has a mechanism which integrates all of these individual records during the advance of the member or marker and it also has another means for integrating the reverse movements of the member or marker whereby by means of a comparison of the two it can be readily ascertained at once whether the device is operating properly. The two integration devices have indices which should be in register at all times except when one or the other is moving.

Stated somewhat differently, the invention comprises an electric system, the parts of which may be widely separated or compactly arranged, wherein a regular series of electric current impulses, either direct or alternating, are imposed on a circuit for a length of time or in number proportional to the variable quantity or condition, such duration of the impulses being automatically controlled by means governed or regulated by the condition of such variable factor. Preferably these tests or records are automatically made at predetermined timed intervals. These current impulses whose duration is governed by the variable factor actuate the mechanism for breaking the circuit at the proper moment, and these also synchronously operate a recorder which makes a record of the successive individual tests or readings and a register which integrates such readings or such electric impulses, whereby to secure a mean or average of the variable quantity over a given period.

In order that those skilled in this art may have a full and complete understanding of this invention both from its structural and functional standpoints and may appreciate the numerous advantages and benefits accruing from the employment of a system or mechanism embodying the invention, I have illustrated in the accompanying drawings, forming a part of this specification and throughout the various views of which like reference characters refer to the same parts, two embodiments of the invention, and to these drawings reference should be had in connection with the following detailed description of the invention.

In these drawings:

Figures 1 to 4 inclusive illustrate one embodiment of the invention, and

Figs. 5 to 7 show a different, somewhat modified embodiment.

Fig. 1 illustrates the complete electric system showing elevations of the various mechanisms or instrumentalities connected in the circuits;

Fig. 2 is an edge or side view of that portion of the mechanism controlling the movable contact associated with the pressure-gage;

Fig. 3 is an edge view of the recording and registering mechanism;

Fig. 4 is a detail view of one of the indices of the registering device;

Fig. 5 illustrates a second embodiment of the invention employed in connection with the recording and registering of temperatures;

Fig. 6 is an edge view of the means associated with the thermostat controlling the actuation of the system, and Fig. 7 is an edge or side view of the recording and registering appliance.

Referring first to the system and appliances illustrated in Figs. 1 to 4 inclusive, and assuming, for example, that it is desired to keep a record at a distant station of a fluctuating or varying gas or air pressure by means of a manometer, the system and its associated instrumentalities might take the form shown in these figures, these being provided merely as one example, or one feasible embodiment of the invention.

The manometer 20 is of the usual bent-glass-tube type containing a body of mercury 21, the height or position of which in the legs of the tube varies with the fluid pressure to which it is subjected through the connection 22. The other leg or branch of the tube is associated with a properly-graduated vertical-scale 23, the reading on which by the level of the mercury indicates the pressure imposed thereon at that moment in the other leg.

Immersed in this mercury is a slidable electric-contact 24 secured to a properly-guided vertically-reciprocatory rack 25, the teeth of which are in mesh with those of a suitably mounted rotary gear 26 having fixed thereto and movable therewith a casting 27 carrying a solenoid 28 provided internally with a pole-piece 29 and a sliding core 30 pressed upwardly by a torsional spring 31 and equipped with two oppositely-disposed spring pawls 32 and 33 engaging diametrically opposite teeth of a ratchet-wheel 34 on a shaft 35 revoluble in a bearing 36 of the casting and provided with a pinion 37 in mesh with a larger gear 38 located between the casting and gear 26 and rotatable on their common connecting hub.

This gear 38 is also in mesh with a pinion 39 of the same size as pinion 37, the shaft 40 of which is mounted in a convenient stationary bracket and is fitted with a like ratchet-wheel 41 operated by a pair of pawls 42 and 43 on spring arms mounted on the core 44 of a solenoid or electro-magnet 45 fastened to the base board 46, the core being pressed down by a coil spring 47 one end of which is secured to the board and the other operatively associated with the core. It will be at once appreciated that the two solenoids and the mechanisms which they directly operate are practically the same except that the one is stationary and the other is mounted to rock.

On the base adjacent to the larger gear 38 I provide a stationary electric-terminal 50 and a coöperating electric-terminal 51 on a spring arm 52 and on the oscillatory casting 27 I mount an adjustable projection or screw 53 adapted under certain circumstances to engage the movable terminal and force it away from its companion stationary terminal, thus breaking or interrupting the electric circuit between them.

It will be apparent, therefore, that if the solenoid 45 is energized by a regular series of electric current impulses, either alternating or direct current, its ratchet-wheel, during the rise of the core or armature, will be advanced one step by pawl 42 and when the core descends under the influence of spring 47 and its own weight upon each cessation of current flow between impulses, the ratchet-wheel will be given a further advance step by the other pawl 43. The consequent rotation of pinion 39, gear 38, casting 27, (pinion 37, turning with but not relatively to gear 38 and acting as the driving-connection between the gear and casting) and gear 26, causes the ascent of rack 25 and its electric-contact 24. At the beginning of these movements of the parts, the screw 53 is caused to travel with the casting away from terminal arm 52, thus permitting the two terminals 51 and 50 to contact.

One object in providing a vibratory electro-magnetic motor of this type is to supply one which can operate not only efficiently and reliably, but also very rapidly. In this structure, the internal pole-piece is employed so as to have a very small magnetic gap between it and the movable core, whereby not only to secure efficiency and economy in operation, but also to make the sliding travel of the core comparatively small. When a sixty-cycle alternating current is employed, the ratchet-wheel and its pinion are stepped around 240 times per second.

On the other hand, when the solenoid 28 is energized by such a series of current impulses, it revolves the pinion 37 step by step in similar manner, but inasmuch as the gear 38 is held against rearward rotation by reason of the pawls 42 and 43, the casting and its associated parts rock counter-clockwise, the gear 26 causing the descent or restoration of the rack and electric-contact to zero or normal position. When the lower end of such contact thus immersed in the mercury reaches the zero position on scale 23, the screw 53 will move the arm 52 to break the contact between the terminals 50 and 51, thus deënergizing magnet 28 by reason of the circuit connection hereinafter described in detail, and leaving the contact 24 in its normal or zero position until the solenoid 45 is again energized.

The timing appliance which controls the intermittent actuation of the system comprises a clock 60 having hour and minute hands 61 and 62 respectively. A gear 63 is secured to and revolved with the minute hand and is in mesh with a larger gear 64 carrying an insulation toothed cam 65 on the edge surface of which rides the top end of an electrically-conductive spring-arm 66 carrying a contact 67. This arm is connected to the secondary coil of a transformer 68, the other end of the coil being grounded at 69 and the primary 70 of the transformer being connected in circuit with any suitable source of alternating electric current, not shown. On the opposite sides of contact 67 are two contacts 71 and 72 mounted on conducting arms 73 and 74 respectively. The cam is so shaped and arranged that at the proper moment in its rotation by the minute hand, it will cause the contacts 67 and 71 to touch, and immediately upon the end of the spring-arm 66 riding off of the end of the cam-tooth, contacts 67 and 72 will engage. The number of teeth on the cam and the ratio of the gearing 63, 64, is such that the contacts 67 and 71 will be caused to engage one another one thousand times in twenty-four hours. Of course, the contacts 67 and 72 engage a like number of times.

Turning now to the recording and registering or integrating mechanism, it will be seen that this includes a base-board 80 on which near one end a horizontal solenoid 81 is fastened, which operates the feed of the sheet of record paper, effects the record of the individual readings, and actuates the corresponding integrating, registering, or recording portion of the instrument.

A roll of paper is shown at 82, the unwinding record paper sheet 83 from which passes between upper and lower guides 84 and 85. The paper is unrolled or fed forwardly intermittently or step by step by a friction roller 86 on a shaft 87 revoluble in bearings 88, 88, and having on its lower end a ratchet-wheel 89 operated by a spring-pawl 90 mounted on a bar 91 carrying at one end an armature 92 coöperating with the pole of solenoid 81, the other end of the bar being pivoted at 93 to a rock-arm 94 fulcrumed on a shaft 95 in a suitable bracket. A spring 96 connected to the base-board and to the bar normally holds the latter retracted in its left-hand position as shown in Fig. 1. When the solenoid attracts the armature, the bar slides to the right, rocking arm 94 in a like direction and actuating the ratchet-wheel 89 one step, thus feeding forwardly the paper a small amount.

Rotatably mounted on rock-arm 94 is a gear 97 meshing with a pinion 98 fixed to a ratchet-wheel 99, both revoluble about the fulcrum of arm 94 on shaft 95. Solenoid 81 has a core 100 pressed toward the right by a spring 101 and has two spring-mounted pawls 102 and 103 engaging opposite sides of the ratchet-wheel and adapted to rotate it step by step in the same manner that the two solenoids 28 and 45 revolve their ratchet-wheels and pinions.

A vertically-sliding rack 104 carries a marker 105 at its upper end adapted during the movements of the rack to trace spaced vertical lines on the record sheet in length proportional to the fluid pressure on the manometer. The top ends of these lines record the variations or fluctuations in the pressure. Obviously, as soon as solenoid 81 is energized, the paper sheet is advanced one step, gear 97 is shifted into mesh with the rack, and the latter and the marker are elevated step by step. As soon as the solenoid is deënergized, gear 97 is drawn away from the rack under the influence of spring 96 and the rack and marker descend automatically by reason of their weight. It is to be understood that the electric current impulses occur sufficiently rapidly or with adequate frequency to prevent the spring from retracting the armature until the current ceases entirely.

In order to integrate these separate and independent pressure records, I supply shaft 95 with a worm 110 driving a worm-wheel 111 fixed on a screw-threaded shaft 112 rotatable in appropriate bearings. This shaft has a nut index or pointer 113 coöperating with a suitably-graduated scale 114. The nut is of clip form, as shown in Fig. 4, and by pressing its two ends 115 toward one another, it may be temporarily released from the thread of the screw, thus permitting its sliding back to its original position. Any other desirable form of nut and index might be employed in its place.

To integrate the return movements of contact 24, which, of course, is the same thing as providing for the determination of the sum total of the electric-current pulsations employed to restore the contact a number of times to zero position, I provide a second, screw-threaded shaft 120 parallel and adjacent to shaft 112 and equipped with a similar nut index 121. A solenoid 122 by means of like pawls, ratchet-wheel, worm, and worm-wheel, rotates such shaft step by step, as will be readily understood. If the appliance is working properly, these two indices should be in exact register, provided both have completed their complement movements.

The circuit connections are as follows: Arm 73 by means of a wire 130 is connected to the mercury in the tube, contact 24 is connected by a wire 131 to one terminal of solenoid 45, the other being connected by a wire 132 to one terminal of solenoid 81, the companion terminal of which is grounded at 133. Arm 74, by a wire 134 is connected to contact 51, the associated contact 50 being connected by a wire 135 to one terminal of solenoid 28, the other terminal thereof being conductively connected by the member 136 to solenoid 122, the remaining terminal of which is grounded at 137.

The operation of the appliance occurs practically as follows:

Every once in 86.4 seconds cam 65 brings contacts 67 and 71 together, thus completing a circuit from ground 69, through transformer 68, contacts 67 and 71, wire 130, mercury 21, contact 24, solenoid 45, and solenoid 81, to ground at 133. Both magnets being thus simultaneously energized, the solenoid 45 lifts contact 24 step by step until the circuit is broken by the contact leaving the mercury and during this same period and by reason of the same alternating current pulsations, solenoid 81 causes the recording of the movement of the contact by the marker on the sheet of paper and the register of the same by the travel of index 113. It will be quite clear that since both solenoids are in series in the circuit both receive the same number of current impulses, the number of course depending upon the level of the mercury, which in turn is directly proportional to the gas or steam pressure. Thus the vertical mark on the record sheet is proportional to and represents such pressure. The teeth of the cam are so shaped that the contacts 67 and 71 will remain in engagement until after the contact 24 breaks the circuit, and thereafter, contact 67 by reason of its spring arm, will swing into engagement with contact 72, thereby establishing a circuit including ground 69, transformer 68, contacts 67 and 72, wire 134, contacts 51 and 50, solenoid 28, and solenoid 122 to ground at 137. Immediately casting 27, solenoid 28, gear 26, and screw 53, retrace their former forward movement and return to their original positions, at the same time restoring contact 24 to normal or zero position. The movement will continue until screw 53 breaks the circuit at contacts 50, 51. During this operation, which will endure during a period exactly the same as that requiring the elevation of contact 24 and require the same number of electric current pulsations to effect the result, solenoid 122 will feed forward the index 121 an amount the same as the previous feed of index 113 so that they should now be in register, which is a check upon the correct actuation of the device.

When the twenty-four hour period has ended, the record-sheet 83 may be removed, if desired, and the average or mean pressure for such period may be readily determined from scale 114, which may be graduated so as to require division by 1000 or may be graduated so as to give the average reading or pressure without division. Thereupon the two indices 113 and 121 are restored to zero position and the device undertakes the work for the next twenty-four hours.

The other embodiment of the invention shown in Figs. 5 to 7 inclusive is adapted to record temperatures and in its details is somewhat different in structure from the appliance and system presented above, although the two have the main underlying principles in common.

This device includes a coil thermostat 200 equipped with a pointer or arm 201 co-acting with a curved graduated scale 202 over which it swings under changes in temperature influencing the thermostat. A spring-arm 203 is mounted in an insulating manner on the pointer or index at 204 and is grounded at 205, the two members at their upper ends having contacts 206 and 207 normally touching. A bent rock-arm 208 is mounted concentric with the axis of the thermostat and the shaft 209 to which it is affixed is provided with a toothed or gear sector 210 by means of which the arm may be made to follow up the pointer or index. An adjacent solenoid 211 has a pole-piece 212 and a sliding core 213 carrying two oppositely-disposed spring-mounted pawls 214, 215, co-acting at diametrically-opposite points with a ratchet-wheel 216 rotatably mounted at the end of a lever 217 fulcrumed on the base 218 at 219 and having at its opposite end an armature 220 adapted to be attracted to the protruding pole-piece 212, thus rocking the lever. As in the previous instances, the core and its pawls are under the influence of a coil-spring 221 tending to shift them to the right as the parts are viewed in Fig. 5. Mounted on the shaft of the ratchet-wheel is a pinion 222 adapted to operate the sector 210 and arm 208, such pinion normally, however, being out of mesh with such sector.

When the solenoid is subjected to a rapid series of electrical impulses, such as those of an alternating electric current, the armature 220 is immediately attracted by the magnet and held thereto by reason of the relatively-high frequency of the pulsations.

Such movement of the arm throws the pinion into mesh with the sector and the vibratory electric apparatus feeds or advances the arm 208 step by step toward the pointer. When it reaches the latter, it engages spring-arm 203 and separates contacts 206, 207, thus breaking the circuit, and deënergizes magnet 311 which separates the contacts at 313, 314, rendering the vibratory motor inoperative, releasing the sector from the control of the pinion, and permitting the return of arm 208 to zero or neutral position under the influence of a spring 222ª acting thereon.

The timing apparatus is much like that of the other appliance. A pinion 300 is fastened to and rotated by a minute hand of a clock 301 and revolves a gear 302 provided with a toothed or corrugated cam 303 governing the action of a spring-pressed arm 304 whose end rides on the edge thereof. This arm carries a contact 305 functioning with a contact 306 on a conductive spring-arm 307 grounded at 308 and carrying a weight 309 to dampen or retard its movements. These contacts 305, 306 are in series in a grounded circuit 310 including a solenoid 311 and a secondary coil of a transformer 312, the primary of which is coupled with any appropriate source of alternating or pulsating current. The core of the solenoid normally holds a spring-contact 313 depressed out of engagement with a stationary or fixed contact 314 electrically connected to the circuit passing through the coil of the magnet.

The recorder and integration register is practically like the upper portion of that instrument of Fig. 1, and need not be further described except to indicate that the scale 400 thereof is so calibrated that the arm 208 shall make on each operation a definite number of steps before reaching the zero position of the pointer or index of the thermostatic gage. The scale is so graduated as to compensate for such initial movements and their count is not registered. Such a construction permits the arm to step up to the pointer even though the latter is in zero position.

The various electrical instruments are connected together in the following manner: A wire 500 connects the terminal or contact 313 with one terminal of the solenoid 81 of the recorder, the other terminal thereof being connected to one terminal of the solenoid 211 by a wire 501. A wire 502 connects the remaining terminal of the solenoid 211 with the pointer 201 carrying the contact 206.

This embodiment of the apparatus functions as follows:

At predetermined time intervals the cam 303 permits the contact 305 to engage the contact 306 which immediately establishes a circuit through the ground and transformer 312, solenoid 311, and the two contacts under consideration. This energizes magnet 311 causing a lifting of its core, thus permitting the contacts 313, 314, to touch. Thereupon a new circuit is established through the ground including transformer 312, solenoid 311, contacts 314, 313, solenoid 81, solenoid 211, arm 201, contacts 206, 207, and arm 203, which circuit will be maintained closed until the contacts 206 and 207 are separated. Stated somewhat otherwise, a momentary engagement of the contacts 305, 306, is sufficient to establish the other circuit in operation. Immediately the two solenoids 211, and 81, by reason of the current pulsations perform their work during the same time intervals, the solenoid 211 stepping up the arm 208 until it separates the contacts 206, 207, the solenoid 81 operating the recording and integrating appliance as has already been specified.

To those skilled in this art, many minor changes may be made in the appliances illustrated and described without departure from the substance and essence of the invention and without the sacrifice of any of its substantial benefits and advantages. For example, it is not absolutely essential that the element whose condition is modified by the variable quantity or factor shall move before the breaking of the circuit, it being quite sufficient for the purposes of employing this invention to have its condition changed without modification of position.

I claim:

1. A recording system of the character described comprising in combination an electric-circuit, an electro-magnetic operating means and an electro-magnetic recorder in said circuit, and means including said electro-magnetic operating means to send a regularly pulsating electric current through said circuit for a period corresponding to the present status of a variable condition, whereby the recorder registers such status, substantially as described.

2. A recording system of the character described comprising in combination an electric-circuit, an electro-magnetic operating means actuated by the current in and adapted to break said circuit, an electro-magnetic recorder operated by the current in said circuit, means to send a regularly pulsating electric current through said circuit, and means under the influence of a variable condition co-acting with said operating means to govern the time of said circuit interruption by said operating means, whereby the current traverses the circuit for a period corresponding to the present status of said condition and the recorder registers such present status, substantially as described.

3. A recording system of the character described comprising in combination an electric-circuit, an electro-magnetic operating means actuated by the current in and adapted to break said circuit, an electro-magnetic recorder operated by the current in said circuit, means operating at intervals to send a regularly pulsating electric current through said circuit, and means under the influence of a variable condition co-acting with said operating means to govern the times of said circuit interruptions by said operating means, whereby the current traverses the circuit each time for a period corresponding to the then status of said condition and the recorder registers each succeeding status, substantially as described.

4. A recording system of the character described, comprising in combination an electric-circuit, an electro-magnetic operating means actuated by the current in and adapted to break said circuit, an electro-magnetic integrating recorder operated by the current in said circuit, means operating at intervals to send a regularly fluctuating electric current though said circuit, and means under the influence of a variable condition co-acting with said operating means to govern the times of said circuit interruptions by said operating means, whereby the current traverses the circuit each time for a period corresponding to the then status of said condition and the recorder integrates each individual status, substantially as described.

5. A recording system of the character described comprising in combination an electric-circuit, an electro-magnetic operating means actuated by the current in and adapted to break said circuit, an electro-magnetic integrating recorder operated by the current in said circuit, means operating at intervals of 86.4 seconds or decimal multiples thereof to send a regularly fluctuating electric current through said circuit, and means under the influence of a variable condition co-acting with said operating means to govern the times of said circuit interruptions by said operating means, whereby the current traverses the circuit each time for a period corresponding to the then status of said condition and the recorder integrates each individual status, substantially as described.

6. A recording system of the character described comprising in combination an electric-circuit, an electro-magnetic operating means actuated by the current in and adapted to break said circuit, electro-magnetic recording means operated by the current in said circuit, means operating at intervals to send a regularly fluctuating electric current through said circuit, and means under the influence of a variable condition co-acting with said operating means to govern the times of said circuit interruptions by said operating means, whereby the current traverses the circuit each time for a period corresponding to the then status of said condition, the recording means registering each succeeding status and also registering the integrations of each succeeding status, substantially as described.

7. In an appliance of the character described, the combination of an instrument having a movable element whose position is determined by a variable condition, a movable member, vibratory electro-magnetic operating means to move said member from a normal position to one corresponding to that of said element, means to restore said member to said normal position after each actuation thereof, and vibratory electro-magnetic means acting synchronously with said operating means to record the ranges of travel of said member, substantially as described.

8. In an appliance of the character described, the combination of an instrument having a movable element whose position is determined by a variable condition, a movable member, vibratory electro-magnetic operating means to move said member from a normal position to one corresponding to that of said element, means to restore said member to said normal position after each actuation thereof, means to cause said operating means to act at predetermined timed intervals, and vibratory electro-magnetic means acting synchronously with said operating means to record the individual ranges of travel of said member, substantially as described.

9. In an appliance of the character described, the combination of an instrument having a movable element whose position is determined by a variable condition, a movable member, vibratory electro-magnetic operating means to move said member from a normal position to one corresponding to that of said element, means to restore said member to said normal position after each actuation thereof, means to cause said operating means to act at intervals, and vibratory electro-magnetic means acting synchronously with said operating means to record the integration of the individual ranges of travel of said member, substantially as described.

10. In an appliance of the character described the combination of an instrument having a movable element whose position is determined by a variable condition, a movable member, vibratory electro-magnetic operating means to move said member from a normal position to one corresponding to that of said element, means to restore said member to said normal position, means to cause said operating means to act at intervals by sending a regularly fluctuating electric current therethrough, vibratory electro-magnetic means acting in synchronism with said operating means to record the individual ranges of travel of said member, and vibratory electro-magnetic means acting in synchronism with said operating means to record the integration of said individual ranges of travel of said member, substantially as described.

11. In an appliance of the character described, the combination of an instrument having a movable element whose position is determined by a variable condition, a movable member, vibratory electro-magnetic means to operate said member step by step from a normal position to one corresponding to that of said element, means to restore said member to said normal position after each actuation thereof, and vibratory electro-magnetic means operating in synchronism with said member operating means to record the ranges of travel of said member, substantially as described.

12. In an appliance of the character described, the combination of an instrument having a movable element whose position is determined by a variable condition, a movable member, vibratory electro-magnetic means to operate said member step by step from a normal position to one corresponding to that of said element, means to restore said member to said normal position after each actuation thereof, means to cause said operating means to act at intervals by sending a regularly fluctuating electric current therethrough, and vibratory electro-magnetic means operating in synchronism with said operating means to record the integration of the individual ranges of travel of said member, substantially as described.

13. In an appliance of the character described, the combination of an instrument having a movable element whose position is determined by a variable condition, a movable member, vibratory electro-magnetic means to operate said member step by step from a normal position to one corresponding to that of said element, vibratory electro-magnetic means to restore said member step by step to said normal position after each actuation thereof, and vibratory electro-magnetic means acting in synchronism with said operating means to record the ranges of travel of said member, substantially as described.

14. In an appliance of the character described, the combination of an instrument having a movable element whose position is determined by a variable condition, a movable member, vibratory electro-magnetic operating means to move said member step by step from a normal position to one corresponding to that of said element, vibratory electro-magnetic means to restore said member step by step to said normal position, means to cause said member moving mechanisms to operate at intervals by sending a regularly fluctuating electric current therethrough, vibratory electro-magnetic means acting in synchronism with said operating means to record the individual ranges of travel of said member, and vibratory electro-magnetic means acting in synchronism with said operating means to record the integration of the individual ranges of travel of said member, substantially as described.

15. In an appliance of the character described, the combination of an instrument having a movable element whose position is determined by a variable condition, a movable member, vibratory electro-magnetic operating means to move said member step by step from a normal position to one corresponding to that of said element, means to restore said member to said normal position after each actuation thereof, and vibratory electro-magnetic means operated step by step in synchronism with the movements of said member in one direction to record the ranges of travel of said member, substantially as described.

16. In an appliance of the character described, the combination of an instrument having a movable element whose position is determined by a variable condition, a movable member, vibratory electro-magnetic operating means to move said member step by step from a normal position to one corresponding to that of said element, means to restore said member to said normal position, means to cause said operating means to act at intervals by sending a regularly fluctuating electric current therethrough, and vibratory electro-magnetic means operated step by step in synchronism with said operating means to record the integration of the individual ranges of travel of said member, substantially as described.

17. In an appliance of the character described, the combination of an instrument having a movable element whose position is determined by a variable condition, a movable member, means to move said member from a normal position to one corresponding to that of said element and to restore said member to said normal position, means to register the advance movement of said member, and means to register the reverse movement of said member, substantially as described.

18. In an appliance of the character described, the combination of an instrument having a movable element whose position is determined by a variable condition, a movable member, means to move said member from a normal position to one corresponding to that of said element and to restore said member to said normal position, means to cause said member moving mechanism to operate at intervals, means to register the integration of the advance movements of said member including a traveling index, and means to register the integration of the reverse movements of said member including a traveling index normally in register with the first index when it has completed any movement, whereby the correct action of the appliance may be verified, substantially as described.

19. A measuring system of the character described, comprising in combination an electric circuit, an electro-magnetically operated measuring means, a recorder operated synchronously with said measuring means, and means including said measuring means to send a regularly pulsating electric current through said circuit at equal intervals of time for periods of time corresponding to the then status of a variable condition, whereby the measuring means measures the status of such condition and the recorder registers such status, substantially as described.

20. In a measuring system of the character described, the combination of an electro-magnetic integrating recorder, an electric circuit including the coil of said electro-magnet, and means to energize said electro-magnet at intervals by a regularly-pulsating electric current in said circuit for periods of time each proportional to the then status of a variable condition to cause said recorder to operate an amount each time corresponding to such status, whereby said recorder integrates the values of said condition, substantially as described.

HORACE H. WELCH.